(12) United States Patent
Chen et al.

(10) Patent No.: US 8,880,419 B2
(45) Date of Patent: Nov. 4, 2014

(54) ACCOMMODATING UNFORESEEN EVENTS USING AN ELECTRONIC CALENDAR

(75) Inventors: Li Chen, Cary, NC (US); Yongcheng Li, Cary, NC (US); Lun Xiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1478 days.

(21) Appl. No.: 11/306,933

(22) Filed: Jan. 17, 2006

(65) Prior Publication Data

US 2007/0168243 A1    Jul. 19, 2007

(51) Int. Cl.
  G06Q 10/00    (2012.01)
  G06Q 10/06    (2012.01)
  G06Q 10/10    (2012.01)

(52) U.S. Cl.
  CPC ...... G06Q 10/107 (2013.01); G06Q 10/063116 (2013.01); G06Q 10/1095 (2013.01)
  USPC ........................................ 705/7.18; 705/7.19

(58) Field of Classification Search
  USPC .............................................. 705/7.18, 7.19
  See application file for complete search history.

(56) References Cited

U.S. PATENT DOCUMENTS

| | | | |
|---|---|---|---|
| 4,819,191 A | | 4/1989 | Scully et al. |
| 5,692,125 A * | | 11/1997 | Schloss et al. ............... 705/7.16 |
| 6,381,580 B1 * | | 4/2002 | Levinson ..................... 705/7.13 |
| 6,604,059 B2 | | 8/2003 | Strubbe et al. |
| 6,636,888 B1 | | 10/2003 | Bookspan et al. |
| 6,732,080 B1 * | | 5/2004 | Blants .......................... 705/7.18 |
| 6,801,780 B1 * | | 10/2004 | Foladare et al. .............. 455/458 |
| 6,941,349 B2 | | 9/2005 | Godfrey |
| 7,054,667 B2 * | | 5/2006 | Ketola .......................... 455/566 |
| 2003/0014297 A1 * | | 1/2003 | Kaufman et al. ................. 705/9 |
| 2003/0149606 A1 | | 8/2003 | Cragun et al. |
| 2004/0064585 A1 | | 4/2004 | Doss et al. |
| 2005/0165631 A1 | | 7/2005 | Horvitz |

OTHER PUBLICATIONS

Johnson, WJ Weber, "Method of Resolving Overlap Conflict of Calendar Events," IBM Technical Disclosures Bulletin, vol. 37, pp. 83-84, Mar. 1994.

* cited by examiner

Primary Examiner — Mark A Fleischer
(74) Attorney, Agent, or Firm — Steven L. Nichols; Van Cott, Bagley, Cornwall & McCarthy P.C.

(57) ABSTRACT

Methods and computer program products for accommodating unforeseen events using an electronic calendar. Occurrences of unforeseen events pertinent to preexisting appointments are detected. Occurrences of unforeseen events may be detected by, for example, accepting input from the user conveyed by, for example, a keyboard, a mouse click, or a menu selection; or by accepting input from an automated information source that provides, for example, commute times or weather reports. The calendar responds automatically on behalf of the user to the detection of unforeseen events pertinent to preexisting appointments. Response may include sending notifications to other parties to appointments by way of, for example, electronic mail, instant messaging, or voice mail messaging; by canceling appointments; or by rescheduling appointments.

20 Claims, 2 Drawing Sheets

ACCOMMODATING UNFORESEEN EVENTS USING AN ELECTRONIC CALENDAR

BACKGROUND OF THE INVENTION

The invention relates to the field of electronic calendars.

Electronic calendars, which may be provided as functions of personal computers, laptop computers, desktop workstations, personal digital assistants, server applications, and the like, have become widely used as a convenient way of keeping track of appointments or meetings. Examples of software program products that provide such functions include Lotus® Notes® and Microsoft® Outlook.

With the agreement of the calendar's user, meetings may be scheduled directly from electronic meeting invitations that arrive in the form of email to add appointment notices to the appropriate pages of the calendar. The recipient of an invitation either accepts the invitation, at which point a notice is added to the recipient's calendar, or declines the invitation.

After invitations have been accepted, unforeseen events sometimes arise that require meetings or appointments to be rescheduled. For example, a user's calendar may have two appointments scheduled: a first meeting from 9:00 AM to 10:00 AM, followed immediately by a second meeting from 10:00 AM to 11:00 AM. However, the user may be unavoidably detained in the first meeting, so that he or she cannot arrive at the second meeting on-time. In another case, the user may be ill, and therefore unable to keep any of the appointments that he or she has scheduled for the day or for the week. In yet another instance, the user may encounter commuting delays that result in late arrival to the workplace, thereby resulting in delays across the board for all of the day's appointments.

Each of these cases brings the potential for considerable inconvenience. When unforeseen events arise, the user may need to re-enter the calendar to reschedule appointments, or somehow notify other parties to the appointments that the user will not be able to meet the schedule as originally agreed. Thus, there is a need for a convenient way for enabling electronic calendars to accommodate unforeseen events automatically on behalf of the user.

SUMMARY OF THE INVENTION

The invention includes methods and computer program products for accommodating unforeseen events using an electronic calendar. Occurrences of unforeseen events pertinent to preexisting appointments in electronic calendars are detected. Occurrences of unforeseen events may be detected by, for example, accepting input about unforeseen events from the user conveyed by, for example, a keyboard, a mouse click, or a menu selection; or by accepting input from an automated information source that provides, for example, commute times or weather reports. The calendar responds automatically on behalf of the user to the detection of unforeseen events pertinent to preexisting appointments. Responses may include sending notifications to other parties to the appointments by way of, for example, electronic mail, instant messaging, or voice mail messaging; by canceling appointments; or by rescheduling appointments.

BRIEF DESCRIPTION OF THE DRAWINGS

The invention will be best understood by reading the following detailed description together with the drawings, in which.

DETAILED DESCRIPTION

Figure 1:
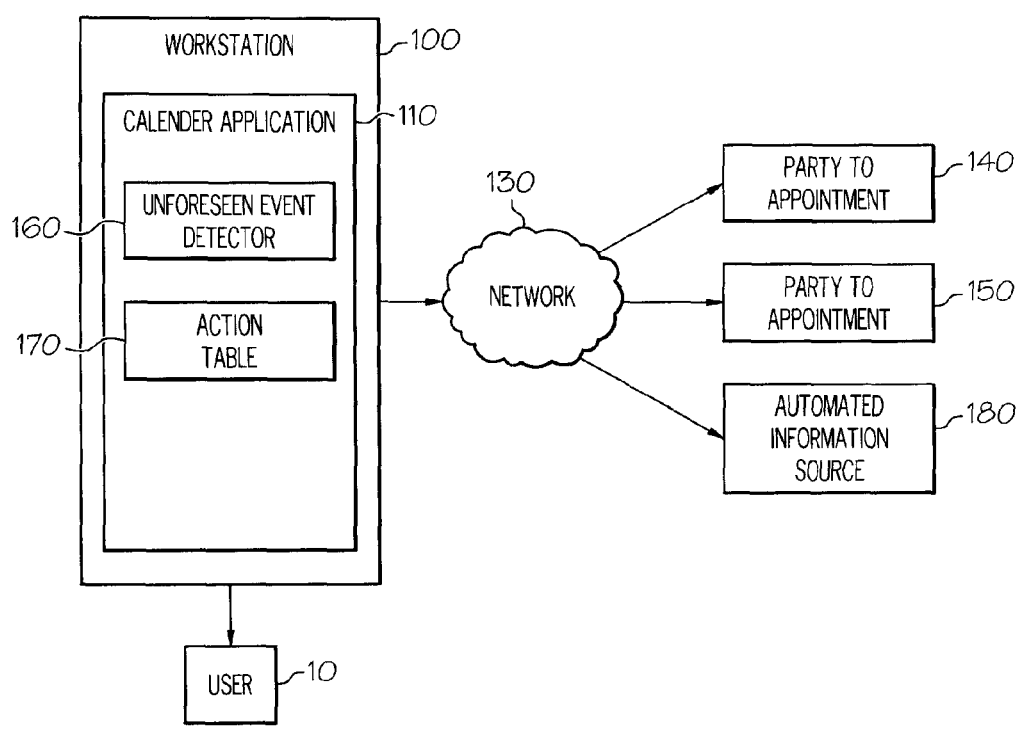
FIG. 1 is a block diagram of an exemplary configuration of the invention.

The present invention will now be described more fully hereinafter, with reference to the accompanying drawings, in which illustrative embodiments of the invention are shown.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an embodiment entirely in hardware, entirely in software, or in a combination of aspects in hardware and software referred to as circuits and modules.

Furthermore, the present invention may take the form of a computer program product on a computer-usable storage medium having computer-usable program code embodied in the medium. Any suitable computer-readable medium may be utilized, including hard disks, CD-ROMs, optical storage devices, magnetic storage devices, and transmission media such as those supporting the Internet or an intranet.

Computer program code for carrying out operations of the present invention may be written in an object oriented programming language such as Java, Smalltalk, or C++. However, the computer program code for carrying out operations of the present invention may also be written in conventional procedural programming languages, such as the C programming language. The program code may execute entirely on the user's computer, partly on the user's computer, as a stand-alone software package, partly on the user's computer and partly on a remote computer, or entirely on a remote computer. The remote computer may be connected to the user's computer through a local area network or a wide area network, or the connection may be made to an external computer, for example through the Internet using an Internet Service Provider.

The present invention is described below with reference to a flowchart illustration and computer program products according to embodiments of the invention. It will be understood that each block of the flowchart can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the specified functions.

These computer program instructions may also be stored, embedded, or embodied in a computer-readable memory that can direct a computer or other programmable data processing apparatus to function in a particular manner, such that the instructions stored in the computer readable memory produce an article of manufacture including instruction means which implement the specified functions.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart.

The invention includes methods and computer program products for accommodating unforeseen events using electronic calendars. Occurrences of unforeseen events pertinent to preexisting appointments in electronic calendars are detected. Occurrences of unforeseen events may be detected by, for example, accepting input about unforeseen events from the user conveyed by, for example, a keyboard, a mouse click, or a menu selection; or by accepting input from an automated information source that provides, for example, commute times or weather reports. The calendar responds automatically on behalf of the user to the detection of unforeseen events pertinent to preexisting appointments. Responses may include sending notifications to other parties to the appointments by way of, for example, electronic mail, instant messaging, or voice mail messaging; by canceling appointments; or by rescheduling appointments.

FIG. 1 is a block diagram of an exemplary configuration of the invention. A user 10 uses a workstation 100 to provide an electronic calendar. The workstation 100 may be, for example, a desktop computer, a laptop computer, a personal digital assistant, and the like.

The workstation 100 may execute a calendar application program 100. It is not a necessary condition of the invention, however, that the calendar application literally reside in the workstation 100, or that the workstation 100 be solely responsible for executing the calendar application 110. Other arrangements as well fall within the scope of the invention, such as an arrangement wherein the calendar application 110 comprises a workstation client and a server that is external to the workstation 100.

The workstation 100 may be connected to a communication network 130, which provides connectivity to other calendar users. These other calendar users are called here, for descriptive convenience, parties to appointment 140, 150. Although FIG. 1 shows only two parties to appointment, the scope of the invention includes other numbers of parties to appointment. The network 130 may be the Internet or an intranet, terrestrial or wireless, public or private, voice or data, and so forth, encompassing any kind of communication network suitable for interconnecting the calendar application 110 and the parties to appointment 140, 150.

As shown in FIG. 1, the calendar application 110 includes an unforeseen event detector 160. In one embodiment of the invention, the unforeseen event detector 160 comprises a mechanism that enables the calendar application 110 to accept information from the user 10, manually entered by the user 10, about occurrences of unforeseen events. This information may be entered by the user 10 through, for example, a computer mouse, a keyboard, or a selection menu. The unforeseen event detector 160 detects the occurrence of an unforeseen event based on this information. Here, the user 10 informs the unforeseen event detector 160 of occurrences of unforeseen events.

For example, a button may be displayed on a visual display, suitable for selection by clicking on the button with a computer mouse. In this embodiment, the user 10 clicks the button to inform the unforeseen event detector 160 that an unforeseen event has occurred.

Several such buttons may be provided. For example, one button may be provided to enable the user 10 to inform the unforeseen event detector 160, and thereby inform the calendar application 110, that the user 10 is running behind schedule. Thus, the unforeseen event detector 160 detects the unforeseen event of running behind schedule by accepting information from the user 10, provided through the button. In one embodiment, clicking on this button may cause a screen to be displayed so that the user 10 can enter the number of minutes that he or she is behind. Another button may be provided to enable the user 10 to inform the unforeseen event detector 160, and thereby inform the calendar application 110, that the user 10 is ill. Clicking on this button may cause a screen to be displayed so that the user 10 can enter the number of hours or days that the user 10 expects to be unable to keep appointments.

Other buttons may be provided to enable the user 10 to enter information regarding other kinds of unforeseen events such as inclement weather or commuting delays. In another embodiment, a selection menu may be provided rather than buttons, to enable the user 10 to select information to convey to the unforeseen event detector 160 by choosing from options presented by the menu.

In another embodiment, the unforeseen event detector 160 accepts information about the occurrence of unforeseen events from an automated information source 180, which may be connected to the calendar application 110 over the communication network 130. The unforeseen event detector 160 detects the occurrence of an unforeseen event using this information by, for example, applying a threshold predetermined by the user 10. Here, the automated information source 180 informs the unforeseen event detector 160 of occurrences of unforeseen events.

For example, the user 10 may establish an account with an automated information source 180 that provides estimated commute times based on traffic flow conditions. The automated information source 180 provides information regarding expected commute times to the unforeseen event detector 160 over the communication network 130. In this example, the expected commute time may be 20 minutes, and the user 10 may set a threshold of 25 minutes. The automated information source 180 may provide estimated commute times to the unforeseen event detector 160, which may then compare these times to the threshold of 25 minutes, or may alert the unforeseen event detector 160 when the estimated commute time exceeds 25 minutes. In either case, the unforeseen event detector 160 accepts the information from the automated information source 180, and detects the unforeseen event of increased commute time using this information.

The calendar application 110 may include an action table 170. The user 10 may enter instructions into the action table 170 indicating how the calendar application 110 is to respond to various unforeseen events, indexed according to the category of unforeseen event detected by the unforeseen event detector 160. Responses to unforeseen events may include sending notifications to other parties to appointments that are affected by the unforeseen events. The notifications may be sent by the calendar application 110 over the network 130 to, for example, parties to appointment 140, 150, using for example email, instant messaging, short message service, datagrams, voice mail messaging, and so forth. Responses to unforeseen events, which responses may be implemented using the notifications just mentioned, may include canceling appointments, delaying appointments, rescheduling appointments, requesting telephone calls, and so forth. Throughout, the term "appointment" is to be interpreted broadly to include any kind of planned or unplanned event pertinent to the electronic calendar.

Figure 2:
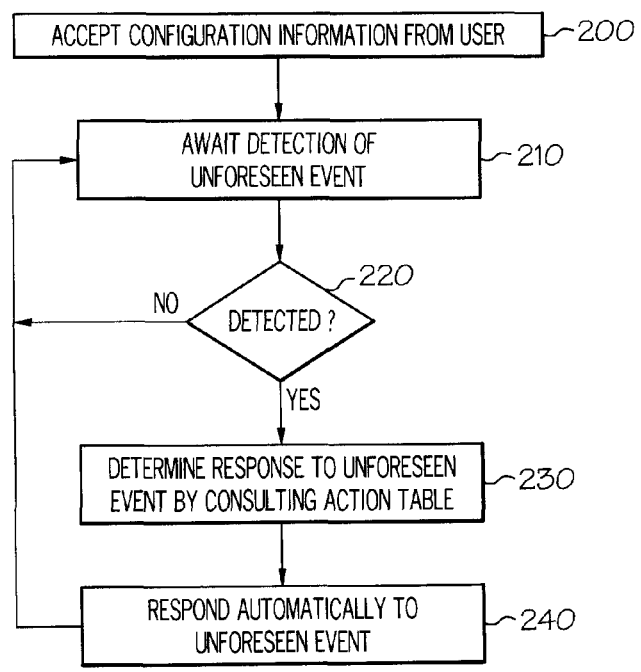
FIG. 2 is a flowchart that illustrates aspects of a method for accommodating unforeseen events using an electronic calendar.

FIG. 2 illustrates aspects of the method for accommodating unforeseen events using an electronic calendar. During a configuration phase, the calendar accepts configuration information from the user regarding unforeseen events (block 200), which information may be entered by the user 10 from a keyboard or keypad, a computer mouse, a selection menu, or any of the like. The configuration information may be stored in the action table 170. During the configuration phase, or at any other convenient time, the user may create or edit the configuration information by, for example, defining and editing unforeseen events, defining and editing responses to be made when unforeseen events occur, and mapping the responses as desired to the unforeseen events.

The calendar application 110 awaits detection of an occurrence of an unforeseen event by the unforeseen event detector 160, as described above (block 210). Absent the detection of an unforeseen event (block 220, "no"), the calendar application 110 continues to await detection of an occurrence of an unforeseen event (block 210).

When the unforeseen event detector 160 detects the occurrence of an unforeseen event (block 220, "yes"), the calendar application 110 determines an appropriate response to the unforeseen event by consulting the action table 170, which is described above (block 230). The calendar application 110 responds automatically to the unforeseen event, as described above (block 240). The logic then returns to await the detection of another unforeseen event (block 210).

Although the foregoing has described methods and computer program products for accommodating unforeseen events using an electronic calendar, the description is illustrative of the invention rather than limiting; the invention is limited only by the claims that follow.

What is claimed is:

1. A system for accommodating unforeseen events comprising:
    a computing device to process and store data in connection with an electronic calendar, the computing device comprising an unforeseen event detector, in which, when operating, the computing device:
    with the unforeseen event detector, detects an occurrence of an unforeseen event pertinent to a preexisting appointment scheduled in an electronic calendar by accepting information provided by an automated information source that provides the computing device with information about the existence of the unforeseen event; and
    automatically responds to detection of the occurrence of the unforeseen event pertinent to the preexisting appointment,
    in which responding automatically comprises sending a number of notifications to other parties to the preexisting appointment, in which responding automatically further comprises indicating an amount of time of delay that the unforeseen event creates, and
    in which the unforeseen event detector applies a threshold in detecting an unforeseen event.

2. The system of claim 1, in which the number of notifications are sent using electronic mail.

3. The system of claim 1, in which the number of notifications are sent using instant messaging.

4. The system of claim 1, in which the number of notifications are sent using voice mail messages.

5. The system of claim 1, in which responding automatically to the occurrence of the unforeseen event pertinent to a preexisting appointment further comprises canceling the preexisting appointment.

6. The system of claim 1, in which responding automatically to the occurrence of the unforeseen event pertinent to a preexisting appointment further comprises rescheduling the preexisting appointment.

7. The system of claim 1, in which detecting an occurrence of an unforeseen event comprises accepting input about the unforeseen event from a user of the electronic calendar.

8. The system of claim 7, in which the input is conveyed by one of: a keyboard entry, a mouse click, and a menu selection.

9. The system of claim 1, in which the information provided by the automated information source concerns one of: a commute time, and a weather report.

10. The system of claim 1, in which the electronic calendar accepts configuration information from a user about unforeseen events, the configuration information defining the unforeseen events.

11. The system of claim 1, in which the threshold is user-definable.

12. The system of claim 1, in which the electronic calendar accepts configuration information from a user about unforeseen events, the configuration information defining responses to be made when unforeseen events occur.

13. The system of claim 1, in which the electronic calendar accepts configuration information from a user about unforeseen events, the configuration information mapping responses to the unforeseen events, the responses to be made when the unforeseen events occur.

14. A computer program product for accommodating unforeseen events using an electronic calendar, the computer program product comprising a computer readable medium having computer readable program code tangibly embedded therein, the computer readable program code comprising:
    computer readable program code for an unforeseen event detector to, when executed by a processor, detect an occurrence of an unforeseen event pertinent to a preexisting appointment scheduled in the electronic calendar; and
    computer readable program code to, when executed by a processor, respond automatically to detection of the occurrence of the unforeseen event pertinent to a preexisting appointment;
    in which the computer readable program code to, when executed by a processor, detect an occurrence of an unforeseen event comprises computer readable program code to, when executed by a processor, accept information provided by an automated information source that provides the computing device with information about the existence of the unforeseen event,
    in which the computer readable program code to, when executed by a processor, respond automatically to detection of the occurrence of the unforeseen event pertinent to a preexisting appointment comprises computer readable program code to, when executed by a processor, indicate an amount of time of delay that the unforeseen event creates, and
    in which the unforeseen event detector applies a threshold in detecting an unforeseen event.

15. The computer program product of claim 14, in which the Computer readable program code to respond automatically to the occurrence of the unforeseen event pertinent to a preexisting appointment comprises:
    computer readable program code to, when executed by a processor, send a number of notifications to other parties to the preexisting appointment.

16. The computer program product of claim 15, in which the number of notifications are sent using one of: electronic mail, instant messaging, and voice mail messages.

17. The computer program product of claim 14, in which the computer readable program code to respond automatically to the occurrence of the unforeseen event pertinent to a preexisting appointment further comprises computer readable program code to, when executed by a processor, cancel the preexisting appointment.

18. The computer program product of claim 14, in which the computer readable program code to respond automatically to the occurrence of the unforeseen event pertinent to a preexisting appointment further comprises computer readable program code to, when executed by a processor, reschedule the preexisting appointment.

19. The computer program product of claim 14, in which the computer readable program code to detect an occurrence of an unforeseen event comprises computer readable program code to, when executed by a processor, accept input about the unforeseen event from a user of the electronic calendar.

20. The computer program product of claim 14, in which the computer readable program code further comprises computer readable program code to, when executed by a processor, accept configuration information from a user about a number of unforeseen events, the configuration information defining the unforeseen events.

\* \* \* \* \*